United States Patent
Yamashita et al.

(10) Patent No.: US 12,544,970 B2
(45) Date of Patent: Feb. 10, 2026

(54) LINK MECHANISM, LINK DEVICE, AND STRETCHING MACHINE

(71) Applicant: THE JAPAN STEEL WORKS, LTD., Tokyo (JP)

(72) Inventors: Shohei Yamashita, Tokyo (JP); Ichiro Nakajima, Tokyo (JP); Atsushi Chikaraishi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 84 days.

(21) Appl. No.: 18/033,338

(22) PCT Filed: Jun. 3, 2021

(86) PCT No.: PCT/JP2021/021240
§ 371 (c)(1),
(2) Date: Apr. 22, 2023

(87) PCT Pub. No.: WO2022/102151
PCT Pub. Date: May 19, 2022

(65) Prior Publication Data
US 2024/0009917 A1    Jan. 11, 2024

(30) Foreign Application Priority Data
Nov. 10, 2020  (JP) ................................. 2020-186920

(51) Int. Cl.
*B29C 55/20* (2006.01)
*B29C 55/16* (2006.01)

(52) U.S. Cl.
CPC .............. *B29C 55/20* (2013.01); *B29C 55/16* (2013.01)

(58) Field of Classification Search
CPC ....... B29C 55/20; B29C 55/16; B29C 55/165; Y10T 29/53104
See application file for complete search history.

(56) References Cited

U.S. PATENT DOCUMENTS 3,491,402 A    1/1970  Yoshifumi et al.

FOREIGN PATENT DOCUMENTS

| JP | 2000-334832 A | 12/2000 | |
| JP | 2005246956 A * | 9/2005 | ........... B29C 55/165 |
| JP | 4379306 B2 | 12/2009 | |

(Continued)

OTHER PUBLICATIONS

Office Action issued May 14, 2024, in Japanese Patent Application No. 2020-186920.

(Continued)

*Primary Examiner* — S. Behrooz Ghorishi
(74) *Attorney, Agent, or Firm* — Potomac Law Group, PLLC (57) ABSTRACT

A link mechanism 11 includes a pair of rail holders 24. The rail holders 24 include guide rollers 51a, 51b, 52a, and 52b configured to move along rails 13 and 14 while rotating, roller shafts 54 and 55 penetrating the guide rollers 51a, 51b, 52a, and 52b, bearings 56a, 56b, 57a, and 57b interposed between the guide rollers 51a, 51b, 52a, and 52b and the roller shafts 54 and 55 and rotatably supporting the guide rollers 51a, 51b, 52a, and 52b, and lower cover members 71 and upper cover members 72 provided on both end sides of the guide rollers 51a, 51b, 52a, and 52b in an axial direction and covering the bearings 56a, 56b, 57a, and 57b.

11 Claims, 8 Drawing Sheets

(56) References Cited

FOREIGN PATENT DOCUMENTS

JP       2017-109423 A     6/2017
JP        2020085128 A  *  6/2020

OTHER PUBLICATIONS

Extended European Search Report and European Search Opinion issued Apr. 18, 2024, in European Patent Application No. 21891400.
International Search Report from International Patent Application No. PCT/JP2021/021240, Jul. 20, 2021.
Office Action issued Apr. 25, 2025, in Chinese Patent Application No. 202180072218.6.
Office Action issued Nov. 6, 2025, in Chinese Patent Application No. 202180072218.6.

* cited by examiner

LINK MECHANISM, LINK DEVICE, AND STRETCHING MACHINE

TECHNICAL FIELD

The present invention relates to a link mechanism, a link device, and a stretching machine.

BACKGROUND ART

A stretching machine configured to stretch a sheet, a film, or the like in a longitudinal direction and a transverse direction while conveying it has been known. For example, Patent Document 1 (Japanese Patent No. 4379306) discloses a simultaneous biaxial stretching machine in which longitudinal stretching and transverse stretching of a sheet-like object are performed simultaneously. The simultaneous biaxial stretching machine disclosed in Patent Document 1 includes endless link devices, and the endless link device includes equal-length link units formed like a folding scale.

The equal-length link unit disclosed in Patent Document 1 includes a plurality of rollers that are rotatably supported by bearings and move on the rails while rotating.

RELATED ART DOCUMENTS

Patent Documents

Patent Document 1: Japanese Patent No. 4379306

SUMMARY OF THE INVENTION

Problems to be Solved by the Invention

In order to lengthen the maintenance interval of the stretching machine and reduce the maintenance frequency, it is desired to extend the life of the bearings used in the stretching machine.

Other problems and novel features will be apparent from the descriptions of this specification and accompanying drawings.

Means for Solving the Problem

According to one embodiment, a link mechanism constitutes a link device used in a stretching machine configured to stretch a film. The link mechanism includes a guide roller whose both ends in an axial direction are open and which moves along a rail while rotating, a shaft penetrating the guide roller, a bearing interposed between the guide roller and the shaft and rotatably supporting the guide roller, and a cover member that covers the bearing is provided on at least one of one end side of the guide roller in the axial direction and the other end side of the guide roller in the axial direction.

Effects of the Invention

According to one embodiment, it is possible to extend the life of the bearings used in the stretching machine.

DETAILED DESCRIPTION OF PREFERRED EMBODIMENTS

Hereinafter, an embodiment will be described in detail with reference to drawings. Note that the members having the same or substantially the same function are denoted by the same reference characters throughout the drawings for describing the embodiment, and the repetitive description thereof will be omitted.

<Configuration of Manufacturing System>

Figure 1:
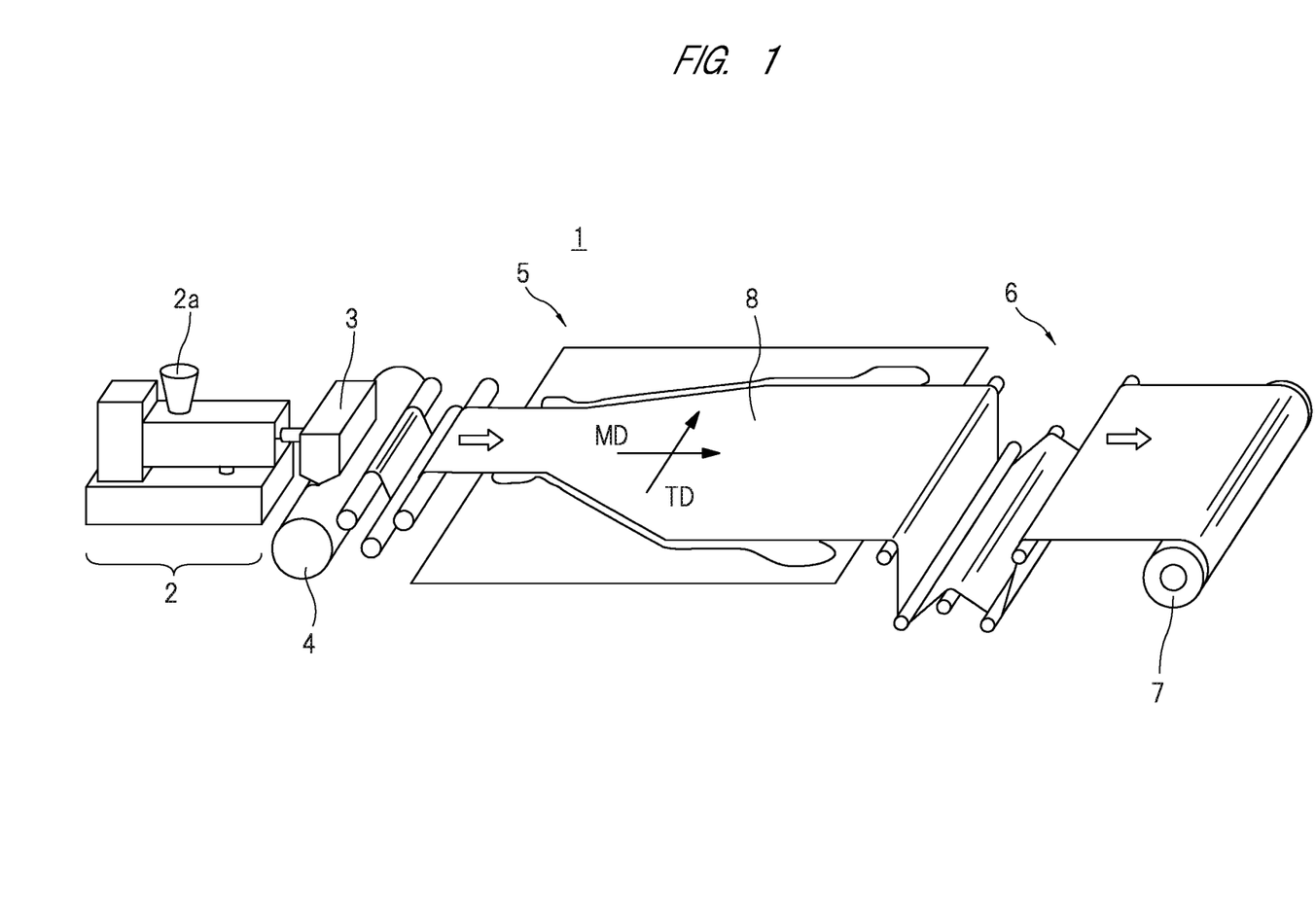
FIG. 1 is a schematic diagram showing a configuration of a thin film manufacturing system according to one embodiment.

FIG. 1 is a schematic diagram showing a configuration of a thin film manufacturing system including a stretching machine. A thin film manufacturing system 1 shown in FIG. 1 includes an extrusion apparatus (extruder, kneading extruder) 2, a T-die 3, a raw sheet cooling apparatus 4, a stretching machine 5, a take-off apparatus 6, and a winder apparatus 7.

In the thin film manufacturing system 1, a thin film is manufactured through the following process. First, a raw material is supplied to a material supply unit (material supply port, hopper) 2a of the extrusion apparatus 2. The raw material to be supplied to the extrusion apparatus 2 contains a resin material (for example, thermoplastic resin material in pellet shape), additives, and others. The raw material supplied to the extrusion apparatus 2 is conveyed (transported) while being kneaded (mixed). Specifically, the raw material supplied to the extrusion apparatus 2 is melt and kneaded while being sent forward by the rotation of a screw in the extrusion apparatus 2. The raw material kneaded by the extrusion apparatus 2 (kneaded material) is supplied to the T-die 3. The kneaded material supplied to the T-die 3 is extruded toward the raw sheet cooling apparatus 4 through a slit of the T-die 3. The kneaded material supplied from the extrusion apparatus 2 to the T-die 3 is formed into a predetermined shape (in this case, film-like shape) by passing through the T-die 3.

The kneaded material extruded from the T-die 3 is cooled and turned into a film 8 in the raw sheet cooling apparatus 4. The film 8 is a resin film in a solidified state (solid state). More specifically, the film 8 is a thermoplastic resin film. The film 8 is continuously extruded from the T-die 3. As a result, the film 8 is continuously supplied to the stretching machine 5.

The film 8 supplied to the stretching machine 5 is stretched in an MD direction and a TD direction by the stretching machine 5. The film 8 subjected to the stretching process (stretching treatment) by the stretching machine 5 is conveyed to the winder apparatus 7 via the take-off apparatus 6 and is wound by the winder apparatus 7. The film 8 wound by the winder apparatus 7 is cut as appropriate.

The thin film manufacturing system 1 shown in FIG. 1 manufactures a thin film through the process described above. Understandably, the thin film manufacturing system 1 can be variously modified in accordance with the properties of the thin film to be manufactured. For example, an extraction tank may be provided near the take-off apparatus 6 shown in FIG. 1, and the plasticizer (for example, paraffin or the like) contained in the film 8 may be removed in some cases.

The stretching machine 5 constituting the thin film manufacturing system 1 stretches the film 8 in the MD direction and the TD direction while conveying the film 8 in the MD direction. In other words, the MD (Machine Direction) direction is a conveying direction of the film 8. Further, the TD (Transverse Direction) direction is the direction that intersects the conveying direction of the film 8. Thus, in the following description, the MD direction is referred to as a "conveying direction" or a "longitudinal direction", and the TD direction is referred to as a "lateral direction" in some cases. The MD direction (conveying direction, longitudinal direction) and the TD direction (lateral direction) are the directions intersecting each other, and are more specifically the directions orthogonal to each other. Namely, the stretching machine 5 shown in FIG. 1 is a stretching machine capable of simultaneously stretching the film 8 in two directions intersecting each other while conveying the film 8, and is referred to as a "simultaneous biaxial stretching machine" in general.

<Stretching Machine>

Figure 2:
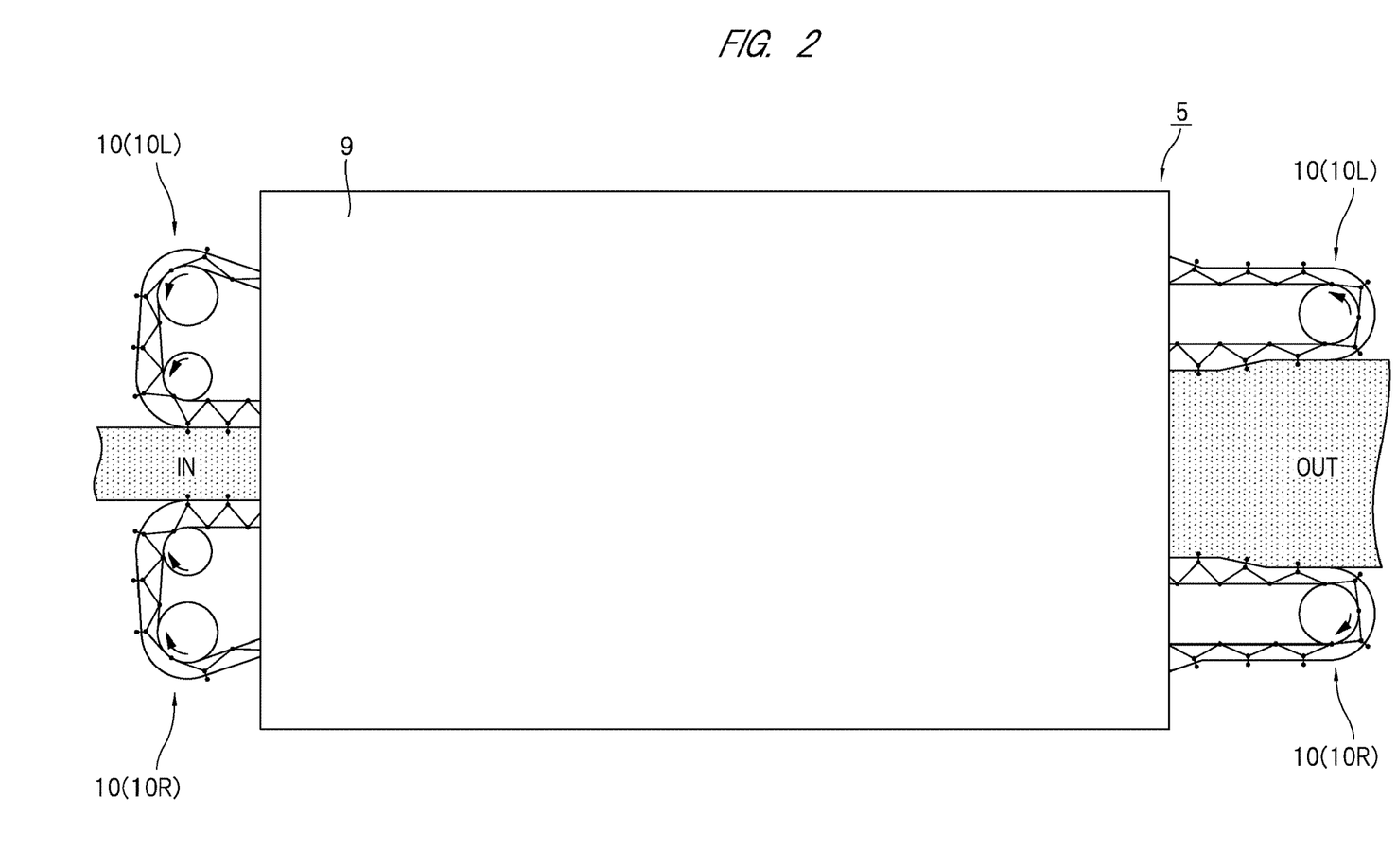
FIG. 2 is a plan view showing the configuration of the thin film manufacturing system shown in FIG. 1.
Figure 3:
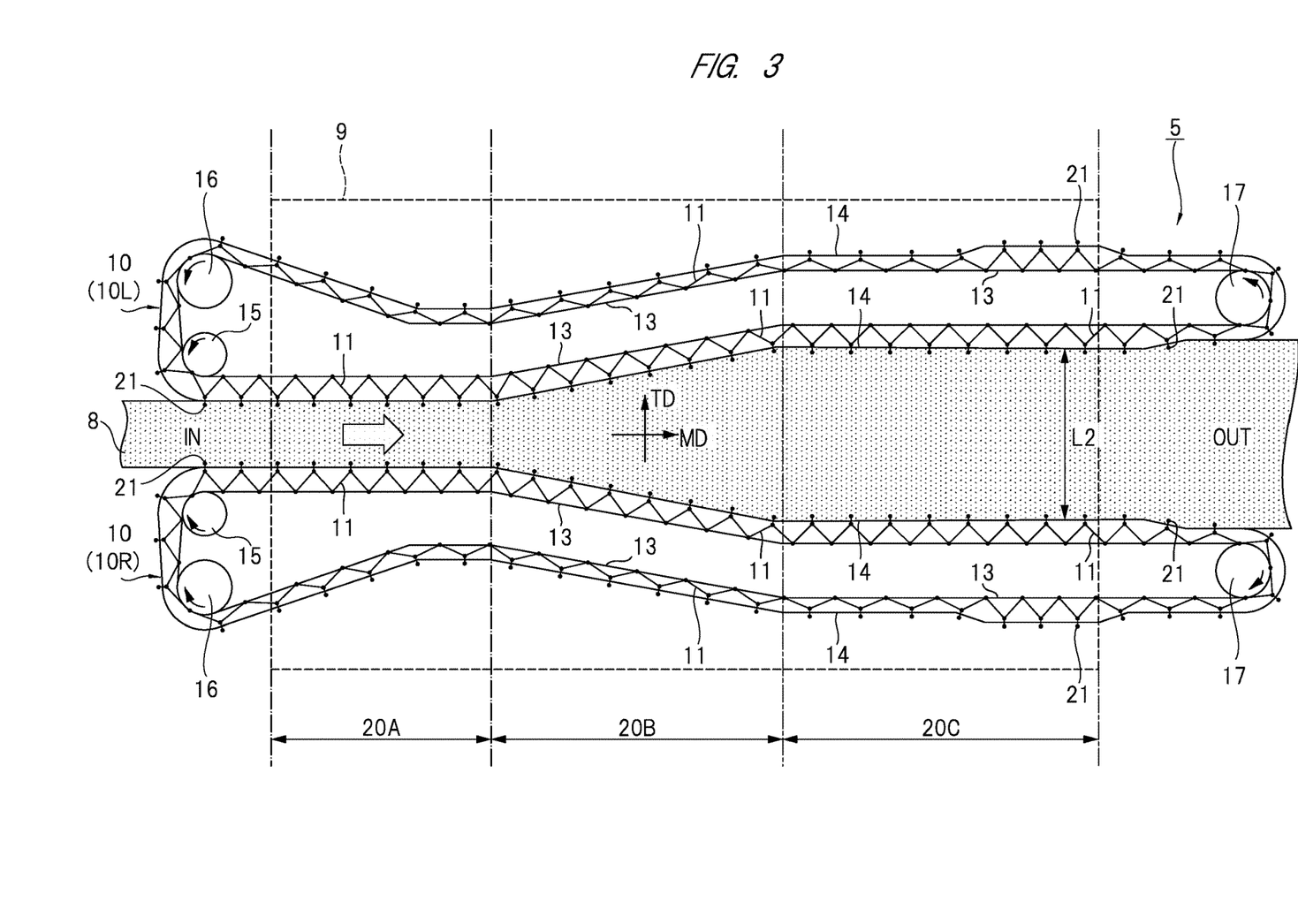
FIG. 3 is another plan view showing the configuration of the thin film manufacturing system shown in FIG. 1.

Next, the stretching machine 5 will be described in more detail. FIG. 2 and FIG. 3 are plan views schematically showing the structure of the stretching machine 5. The stretching machine 5 includes a pair of link devices 10. The pair of link devices 10 are arranged apart from each other in plan view. In the following description, one of the pair of link devices 10 is referred to as a "link device 10R" and the other of the pair of link devices 10 is referred to as a "link device 10L" for distinction in some cases. Understandably, such a distinction is merely for convenience of description.

In FIG. 2 and FIG. 3, the link device 10R is arranged on the right side (R side) with respect to the conveying direction (MD direction), and the link device 10L is arranged on the left side (L side) with respect to the conveying direction (MD direction). The link device 10R and the link device 10L are separated from each other in the TD direction and face in the TD direction with the film 8 interposed therebetween. The film 8 is conveyed through the space between the link device 10R and the link device 10L in the MD direction. In other words, the space between the link device 10R and the link device 10L facing each other functions as a conveyance unit for conveying the film 8.

With reference to FIG. 3, the stretching machine 5 is divided into three regions 20A, 20B, and 20C in the conveying direction (MD direction). The region 20A serves as a preheating region, the region 20B serves as a stretching region, and the region 20C serves as a heat fixing region. The regions 20A, 20B, and 20C are arranged in this order in the conveying direction (MD direction).

The inlet of the film 8 in the stretching machine 5 (portion indicated by "IN" in FIG. 2 and FIG. 3) exists in the region 20A. Also, the outlet of the film 8 in the stretching machine 5 (portion indicated by "OUT" in FIG. 2 and FIG. 3) exists in the region 20C. Further, the region 20B in which the stretching process is performed is present between the region 20A in which the inlet of the film 8 exists and the region 20C in which the outlet of the film 8 exists.

A heat treatment unit 9 covers a part of the region 20A, all of the region 20B, and a part of the region 20C. Also, the heat treatment unit 9 covers the central parts of the link devices 10R and 10L, and heats the film 8 conveyed by the link devices 10R and 10L. The heat treatment unit 9 in this embodiment is composed of an oven capable of heating the film 8 to a desired temperature. The film 8 passes through the inside of the oven as the heat treatment unit 9 while being gripped by the link devices 10R and 10L.

<Link Device>

As shown in FIG. 2 and FIG. 3, each of the link devices 10R and 10L includes a plurality of link mechanisms 11 coupled so as to form an endless chain, and each of the link mechanisms 11 has a clip 21 which is a jig for gripping the film 8. The film 8 is held by the clips 21 in the link mechanisms 11 constituting the link device 10R and the clips 21 in the link mechanisms 11 constituting the link device 10L. Namely, one side (R side/right side) of the film 8 is gripped by the plurality of clips 21 of the link device 10R, and the other side (L side/left side) of the film 8 is gripped by the plurality of clips 21 of the link device 10L.

Each of the link devices 10R and 10L further includes a pair of rails 13 and 14 arranged on a support table (bed) in addition to the plurality of link mechanisms 11. In each of the link devices 10R and 10L, the rail 13 is arranged on an inner circumferential side, and the rail 14 is arranged on an outer circumferential side. Thus, the rail 13 is referred to as an "inner rail" and the rail 14 is referred to as an "outer rail" in some cases. Also, the rail 13 is referred to also as a "reference rail" or an "SP rail" and the rail 14 is referred to also as an "MD rail" in some cases.

The rails 13 and 14 provided in each of the link devices 10R and 10L are annularly arranged over the regions 20A, 20B, and 20C. More specifically, the rails 13 and 14 are turned back in the region 20A in which the inlet of the film 8 is present, are turned back in the region 20C in which the outlet of the film 8 is present, and are annularly arranged over the regions 20A, 20B, and 20C.

Three sprockets 15, 16, and 17 are provided inside the rail 13 of the link device 10R. Similarly, three sprockets 15, 16, and 17 are provided inside the rail 13 of the link device 10L. The sprockets 15 and 16 of the respective link devices 10R and 10L are arranged in the region 20A, and the sprockets 17 of the respective link devices 10R and 10L are arranged in the region 20C. However, the sprockets 15 and 16 are arranged outside the heat treatment unit 9 that covers a part of the region 20A. Further, the sprockets 17 are arranged outside the heat treatment unit 9 that covers a part of the region 20C. Namely, the sprockets 15, 16, and 17 of the respective link devices 10R and 10L are arranged outside the oven as the heat treatment unit 9.

The plurality of link mechanisms 11 in the link devices 10R and 10L are arranged on the rails 13 and 14 in a state of being able to move along the rails 13 and 14. The sprockets 15, 16, and 17 of the link device 10R shown in FIG. 3 engage with the plurality of link mechanisms 11 of the link device 10R. Therefore, when the sprockets 15, 16, and 17 rotate, a driving force acts on the plurality of link mechanisms 11 of the link device 10R, and the link mechanisms 11 move (run) along the rails 13 and 14 of the link device 10R. The sprockets 15, 16, and 17 of the link device 10L shown in FIG. 3 engage with the plurality of link mechanisms 11 of the link device 10L. Therefore, when the sprockets 15, 16, and 17 rotate, a driving force acts on the plurality of link mechanisms 11 of the link device 10L, and the link mechanisms 11 move (run) along the rails 13 and 14 of the link device 10L. Namely, the rails 13 and 14 of the respective link devices 10R and 10L are guide rails for moving (running) the plurality of link mechanisms 11 in a predetermined direction.

In the following description, for each of the link devices 10R and 10L shown in FIG. 3, the side facing the film 8 is referred to as a "film side", and the side opposite to the film side is referred to as a "return side" in some cases. Namely, the side on which the plurality of link mechanisms 11 move from the inlet (IN) to the outlet (OUT) while the clips 21 are gripping the film 8 is the film side, and the side which is located on the opposite side of the film side and on which the plurality of link mechanisms 11 move from the outlet (OUT) to the inlet (IN) while the clips 21 do not grip the film 8 is the return side.

The pitch between the adjacent link mechanisms 11 (referred to as a "link pitch" in some cases) of the plurality of link mechanisms 11 changes in accordance with the interval (separation distance) between the rail 13 and the rail 14. In other words, the pitch between the adjacent link mechanisms 11 can be adjusted by adjusting the separation distance between the rail 13 and the rail 14.

Figure 4A:
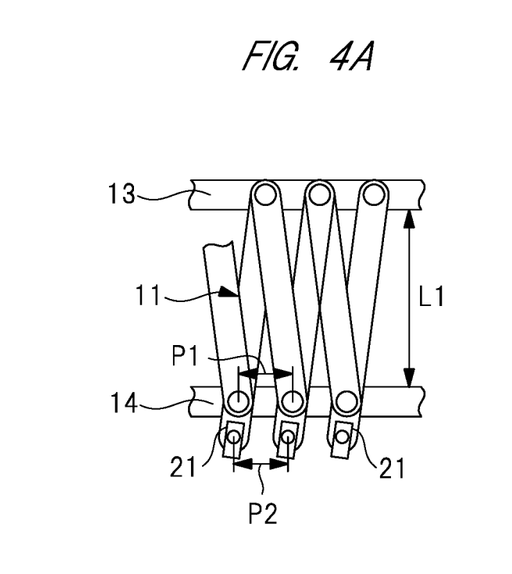
FIG. 4A is a plan view schematically showing the link mechanisms and the rails shown in FIG. 3.
Figure 4B:
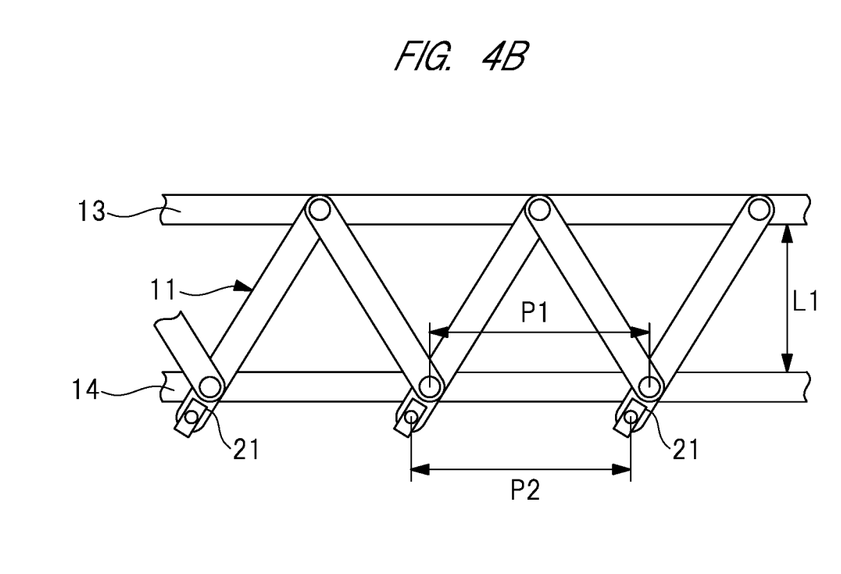
FIG. 4B is another plan view schematically showing the link mechanisms and the rails shown in FIG. 3.

FIG. 4A and FIG. 4B are plan views schematically showing the link mechanisms and the rails shown in FIG. 3. As shown in FIG. 4A and FIG. 4B, the angle formed by the adjacent link mechanisms 11 becomes larger and the pitch P1 between the adjacent link mechanisms 11 becomes larger as the separation distance L1 between the rails 13 and 14 becomes smaller. On the other hand, the angle formed by the adjacent link mechanisms 11 becomes smaller and the pitch P1 between the adjacent link mechanisms 11 becomes smaller as the separation distance L1 between the rails 13 and 14 becomes larger.

As described above, each link mechanism 11 has the clip 21 configured to grip the film 8. Therefore, the pitch P2 between the adjacent clips 21 also increases and decreases in accordance with the increase and decrease of the pitch P1 between the adjacent link mechanisms 11. Specifically, the pitch P1 between the link mechanisms 11 increases when the separation distance L1 of the rails 13 and 14 decreases, and the pitch P2 between the clips 21 also increases when the pitch P1 between the link mechanisms 11 increases (FIG. 4A→FIG. 4B). On the other hand, the pitch P1 between the link mechanisms 11 decreases when the separation distance L1 of the rails 13 and 14 increases, and the pitch P2 between the clips 21 also decreases when the pitch P1 between the link mechanisms 11 decreases (FIG. 4B→FIG. 4A).

Since each of the plurality of link mechanisms 11 includes the clip 21, the pitch P1 between the two adjacent link mechanisms 11 and the pitch P2 between the two clips 21 provided in these link mechanisms 11 are the same. Namely, P1=P2 holds in each of FIG. 4A and FIG. 4B.

<Operation of Stretching Machine (Simultaneous Biaxial Stretching Machine)>

The film 8 supplied from the raw sheet cooling apparatus 4 to the stretching machine 5 is gripped by the link devices 10R and 10L at the inlet of the stretching machine 5. Specifically, the film 8 is gripped by the clips 21 provided in the link mechanisms 11 of the link devices 10R and 10L shown in FIG. 2 and FIG. 3. More specifically, one side of the film 8 in the width direction is gripped by the clips 21 provided in the link mechanisms 11 of the link device 10R, and the other side of the film 8 in the width direction is gripped by the clips 21 provided in the link mechanisms 11 of the link device 10L.

The film 8 whose both sides in the width direction are gripped by the clips 21 is conveyed from the inlet to the outlet of the stretching machine 5 along with the movement of the link mechanisms 11 including the clips 21, and passes through the region 20A (preheating region), the region 20B (stretching region), and the region 20C (heat fixing region) in this order. The film 8 is stretched in the MD direction and the TD direction while passing through the region 20B (stretching region). Thereafter, the film 8 reaches the outlet through the region 20C (heat fixing region) and is detached from the clips 21. The film 8 detached from the clips 21 is conveyed to the take-off apparatus 6 and is further conveyed from the take-off apparatus 6 to the winder apparatus 7.

As shown in FIG. 3, in the region 20A (preheating region), the interval (separation distance in the TD direction) L2 between the rails 13 and 14 of the link device 10R and the rails 13 and 14 of the link device 10L is almost constant. Therefore, the stretching process of the film 8 in the TD direction is not performed in the region 20A. Accordingly, the width (dimension in the TD direction) of the conveyed film 8 does not change and remains constant in the region 20A.

Also, in the region 20A, the interval (separation distance) L1 between the rail 13 and the rail 14 of the link device 10R on the film side is almost constant. Therefore, in the region 20A, the pitch P1 of the link mechanisms 11 of the link device 10R on the film side is almost constant, and thus the pitch P2 of the clips 21 of the link device 10R on the film side is also almost constant. Further, in the region 20A, the interval (separation distance) L1 between the rail 13 and the rail 14 of the link device 10L on the film side is also almost constant. Therefore, in the region 20A, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the region 20A. Namely, the stretching process of the film 8 in the TD direction and the MD direction is not performed in the region 20A.

Next, the operation of the stretching machine 5 in the region 20B will be described. In the region 20B, the interval (interval in the TD direction) between the rails 13 and 14 of the link device 10R and the rails 13 and 14 of the link device 10L gradually increases along the conveying direction (MD direction). Therefore, in the region 20B, the film 8 is pulled and stretched in the TD direction as it advances in the conveying direction (MD direction). In other words, in the region 20B, the width (dimension in the TD direction) of the film 8 gradually increases as it advances in the conveying direction (MD direction).

Also, in the region 20B, the interval (separation distance) L1 between the rail 13 and the rail 14 of the link device 10R on the film side gradually decreases along the conveying direction (MD direction), and the interval (separation distance) L1 between the rail 13 and the rail 14 of the link device 10L on the film side also gradually decreases along the conveying direction (MD direction). Therefore, in the region 20B, the pitch P1 of the link mechanisms 11 of the link device 10R on the film side gradually increases along the conveying direction (MD direction), and thus the pitch P2 of the clips 21 of the link device 10R on the film side also gradually increases. Further, in the region 20B, the pitch P1 of the link mechanisms 11 of the link device 10L on the film side gradually increases along the conveying direction (MD direction), and thus the pitch P2 of the clips 21 of the link device 10L on the film side also gradually increases. As a result, in the region 20B, the film 8 is pulled and stretched in the MD direction as it advances in the conveying direction (MD direction).

Therefore, in the region 20B, the film 8 is stretched in the TD direction and the MD direction as it advances in the conveying direction (MD direction). Namely, in the region 20B, the stretching process in the TD direction and the MD direction is applied to the film 8.

Next, the operation of the stretching machine 5 in the region will be described. In the region 20C, the interval (interval in the TD direction) between the rails 13 and 14 of the link device 10R and the rails 13 and 14 of the link device 10L is almost constant. Therefore, the stretching process of the film 8 in the TD direction is not performed in the region 20C. Accordingly, the width (dimension in the TD direction) of the conveyed film 8 does not change and remains constant in the region 20C.

Further, in the region 20C, the interval (separation distance) L1 between the rail 13 and the rail 14 of the link device 10R on the film side is almost constant. Therefore, in the region 20C, the pitch P1 of the link mechanisms 11 of the link device 10R on the film side is almost constant, and thus the pitch P2 of the clips 21 of the link device 10R on the film side is also almost constant. Further, in the region 20C, the interval (separation distance) L1 between the rail 13 and the rail 14 of the link device 10L on the film side is almost constant. Therefore, in the region 20C, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the region 20C. Namely, the stretching process of the film 8 in the TD direction and the MD direction is not performed in the region 20C.

As described above, in the region 20A, the pitch P1 of the link mechanisms 11 of the link device 10R on the film side is kept constant, and the pitch P1 of the link mechanisms 11 of the link device 10L on the film side is also kept constant. Thereafter, in the region 20B, the pitch P1 of the link mechanisms 11 of the link device 10R on the film side and the pitch P1 of the link mechanisms 11 of the link device 10L on the film side are gradually expanded. Then, in the region 20C, the pitch P1 of the link mechanisms 11 of the link device 10R on the film side is kept constant again, and the pitch P1 of the link mechanisms 11 of the link device 10L on the film side is also kept constant again. Therefore, on the film side of each of the link devices 10R and 10L, the pitch P1 of the link mechanisms 11 in the region 20C is larger than the pitch P1 of the link mechanisms 11 in the region 20A. From another viewpoint, on the film side of each of the link devices 10R and 10L, the pitch P2 of the clips 21 in the region 20C is larger than the pitch P2 of the clips 21 in the region 20A. From still another viewpoint, on the film side of each of the link devices 10R and 10L, the separation distance L1 between the rails 13 and 14 in the region 20C is smaller than the separation distance L1 between the rails 13 and 14 in the region 20A.

<Configuration of Link Mechanism>

Figure 5:
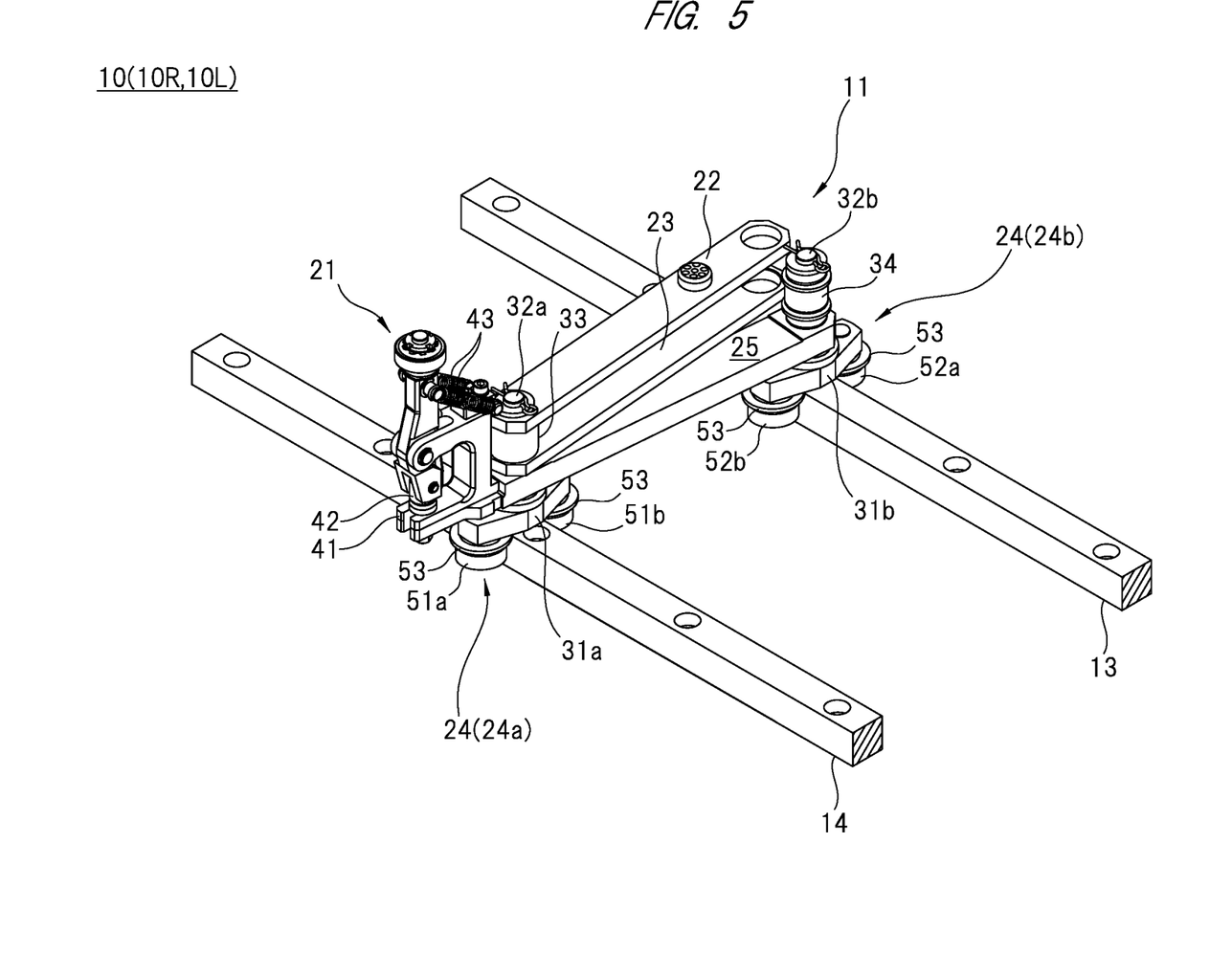
FIG. 5 is a perspective view showing one of the plurality of link mechanisms shown in FIG. 3 in an enlarged manner.
Figure 6:
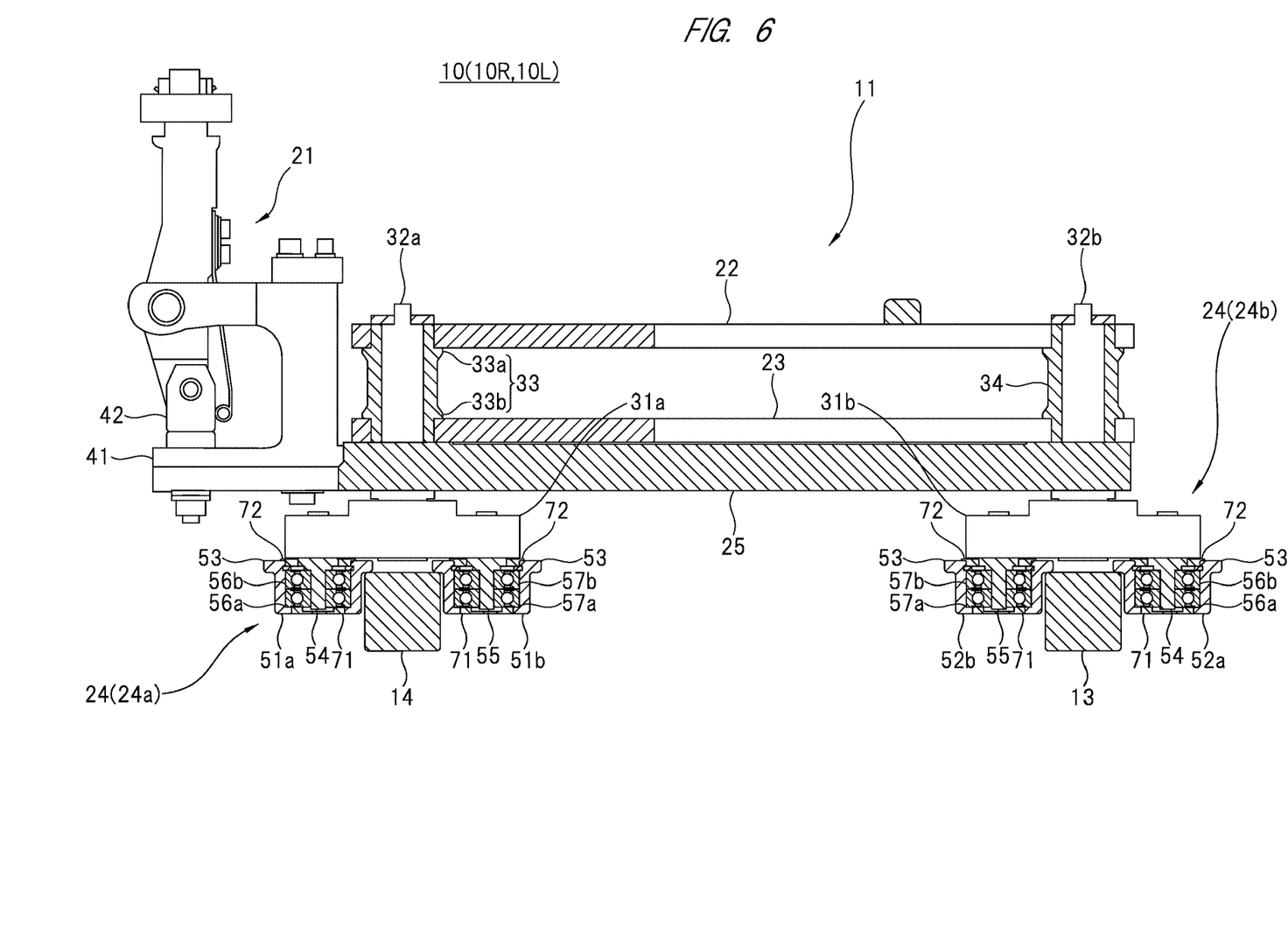
FIG. 6 is a cross-sectional view of the link mechanism shown in FIG. 5.

FIG. 5 is a perspective view showing one of the plurality of link mechanisms shown in FIG. 3 in an enlarged manner. FIG. 6 is a cross-sectional view of the link mechanism shown in FIG. 5.

As shown in FIG. 5 and FIG. 6, each of the link mechanisms 11 provided in the link devices 10R and 10L includes an upper link plate 22, a lower link plate 23, a pair of rail holders 24a and 24b, and a base member 25 bridging the pair of rail holders 24a and 24b in addition to the clip 21. One rail holder 24a is arranged on the rail 14, and the other rail holder 24b is arranged on the rail 13.

The upper link plate 22 and the lower link plate 23 are plate-shaped members that extend linearly in plan view. The base member is common with the upper link plate 22 and the lower link plate 23 in that it extends linearly in plan view, but the base member 25 is thicker than these. In the following description, when the rail holders 24a and 24b are not particularly distinguished, they are collectively referred to as "rail holders 24".

<Rail Holder>

The rail holder 24a includes a roller holding portion 31a and a shaft 32a provided at the center of the roller holding portion 31a in the longitudinal direction. The roller holding portion 31a is arranged on the rail 14 so as to straddle the rail 14. Therefore, one end of the roller holding portion 31a arranged on the rail 14 in the longitudinal direction protrudes toward the inner side of the rail 14 (side facing the rail 13), and the other end of the roller holding portion 31a in the longitudinal direction protrudes toward the outer side of the rail 14 (opposite side of the side facing the rail 13). Also, when the roller holding portion 31a is arranged on the rail 14, the shaft 32a is located just above the rail 14.

As shown in FIG. 6, the shaft 32a of the rail holder 24a penetrates one ends of the upper link plate 22, the lower link plate 23, and the base member 25 in the longitudinal direction. A collar 33 is placed on the upper portion of the shaft 32a that penetrates one end side (base end side) of the base member 25 in the longitudinal direction and protrudes from the base member 25. Annular engaging portions 33a and 33b are integrally formed on both sides of the collar 33 in the axial direction. A lower insertion portion of the collar 33 located outside the engaging portion 33b in the axial direction is inserted in a through hole provided at one end (base end) of the lower link plate 23 in the longitudinal direction, and the engaging portion 33b overlaps the peripheral edge portion of the through hole of the lower link plate 23. Also, an upper insertion portion of the collar 33 located outside the engaging portion 33a in the axial direction is inserted in a through hole provided at one end (base end) of the upper link plate 22 in the longitudinal direction, and the peripheral edge portion of the through hole of the upper link plate 22 overlaps the engaging portion 33a. From another viewpoint, the base end of the base member 25, the base end of the upper link plate 22, and the base end of the lower link plate 23 are skewered with the shaft 32a, and are rotatably coupled with each other through the shaft 32a. In other words, the shaft 32a is a rotating shaft on the base end side of the upper link plate 22, the lower link plate 23, and the base member 25.

The rail holder 24b includes a roller holding portion 31b and a shaft 32b provided at the center of the roller holding portion 31b in the longitudinal direction. The roller holding portion 31b is arranged on the rail 13 so as to straddle the rail 13. Therefore, one end of the roller holding portion 31b arranged on the rail 13 in the longitudinal direction protrudes toward the inner side of the rail 13 (side facing the rail 14), and the other end of the roller holding portion 31b in the longitudinal direction protrudes toward the outer side of the rail 13 (opposite side of the side facing the rail 14). Also, when the roller holding portion 31b is arranged on the rail 13, the shaft 32b is located just above the rail 13.

The shaft 32b of the rail holder 24b penetrates one end (tip end) of the base member 25 in the longitudinal direction, and protrudes from the base member 25. One ends (tip ends) of the upper link plate 22 and the lower link plate 23 in the longitudinal direction of another adjacent link mechanism 11 are rotatably coupled to the upper portion of the shaft 32*b* that protrudes from the base member 25 through a collar 34 similar to the collar 33. Namely, the tip end of the base member 25 of the link mechanism 11 and the tip ends of the upper link plate 22 and the lower link plate 23 of another adjacent link mechanism 11 are rotatably coupled with each other through the shaft 32*b* of the link mechanism 11. From another viewpoint, the shaft 32*b* is a rotating shaft on the tip end side of the upper link plate 22, the lower link plate 23, and the base member 25.

<Clip>

The clip 21 is provided at the base end of the base member 25. The clip 21 includes a main body portion 41, a grip portion 42, a spring portion 43, and others. The main body portion 41 is fixed to the base end of the base member 25. The grip portion 42 is attached to the main body portion 41 so as to operate vertically. The spring portion 43 biases the grip portion 42 so as to operate the grip portion 42 downward. By making the grip portion 42 operate downward by the biasing force of the spring portion 43, the film 8 is sandwiched between the main body portion 41 and the grip portion 42. Namely, the film 8 is gripped by the clip 21. On the other hand, by making the grip portion 42 operate upward against the biasing force of the spring portion 43, the film 8 is released from the clip 21.

<Guide Roller>

A pair of guide rollers 51*a* and 51*b* facing each other with the rail 14 interposed therebetween are provided in a lower portion of the rail holder 24*a*, and a pair of guide rollers 52*a* and 52*b* facing each other with the rail 13 interposed therebetween are provided in a lower portion of the rail holder 24*b*. The guide rollers 51*a*, 51*b*, 52*a*, and 52*b* are made of metal. Each of the guide rollers 51*a*, 51*b*, 52*a*, and 52*b* has a cylindrical shape whose both ends in the axial direction are open, and a flange 53 protruding in a radially outward direction is integrally formed on one end side (upper portion) in the axial direction.

The flanges 53 of the guide rollers 51*a* and 51*b* provided in a lower portion of the rail holder 24*a* are arranged on the rail 14, and the flanges 53 of the guide rollers 52*a* and 52*b* provided in a lower portion of the rail holder 24*b* are arranged on the rail 13. More specifically, the flange 53 of the guide roller 51*a* overlaps the outer edge of the upper surface of the rail 14 (the opposite side of the side facing the rail 13), and the flange 53 of the guide roller 51*b* overlaps the inner edge of the upper surface of the rail 14 (the side facing the rail 13). Also, the flange 53 of the guide roller 52*a* overlaps the outer edge of the upper surface of the rail 13 (the opposite side of the side facing the rail 14), and the flange 53 of the guide roller 52*b* overlaps the inner edge of the upper surface of the rail 13 (the side facing the rail 14). Thus, the entire link mechanism 11 is supported by the rails 13 and 14 via the guide rollers 51*a* and 51*b* of the rail holder 24*a* and the guide rollers 52*a* and 52*b* of the rail holder 24*b*.

In other words, the guide rollers 51*a*, 51*b*, 52*a*, and 52*b* are support rollers that support the link mechanism 11. More specifically, the guide rollers 51*a*, 51*b*, 52*a*, and 52*b* are cantilever support rollers that support the link mechanism 11 by means of the flanges 53 provided on one end side (upper portion) in the axial direction. From another viewpoint, the guide rollers 51*a*, 51*b*, 52*a*, and 52*b* are flanged rollers having the integrally formed flanges 53.

The four guide rollers 51*a*, 51*b*, 52*a*, and 52*b* have the same shape, structure, size, and the like. Therefore, the shape and structure of the guide rollers 52*a* and 52*b* provided in the rail holder 24*b* will be clarified by describing the shape and structure of the guide rollers 51*a* and 51*b* provided in the rail holder 24*a* in more detail.

As shown in FIG. 6, the roller holding portion 31*a* of the rail holder 24*a* is attached to the lower end of the shaft 32*a* protruding downward from the base member 25 so as to be rotatable about the shaft 32*a* as a rotating shaft. Specifically, the roller holding portion 31*a* is attached to the lower end of the shaft 32*a* via a bearing.

Figure 7:
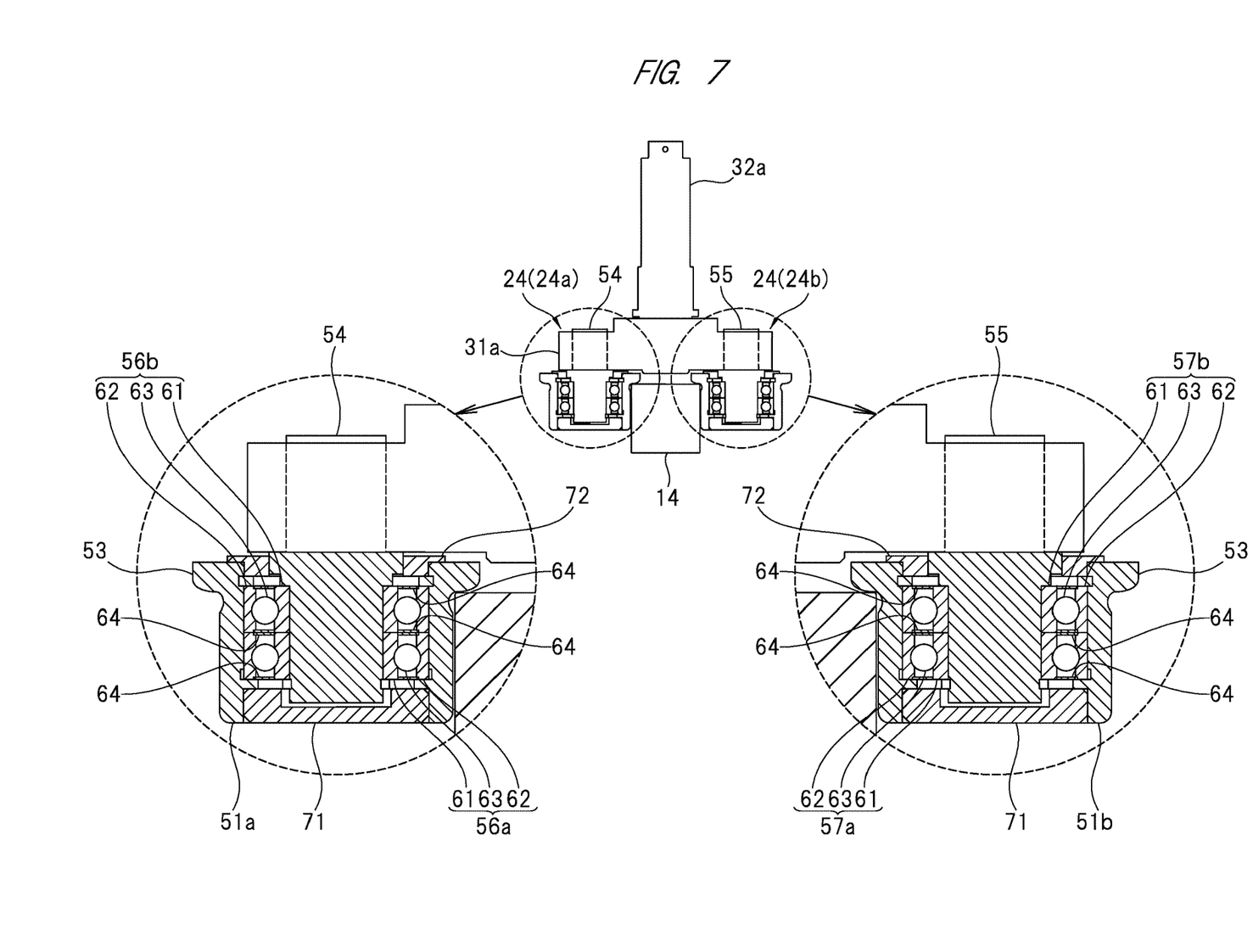
FIG. 7 is a partially enlarged cross-sectional view showing the guide rollers and the surrounding structures thereof shown in FIG. 6.
Figure 8:
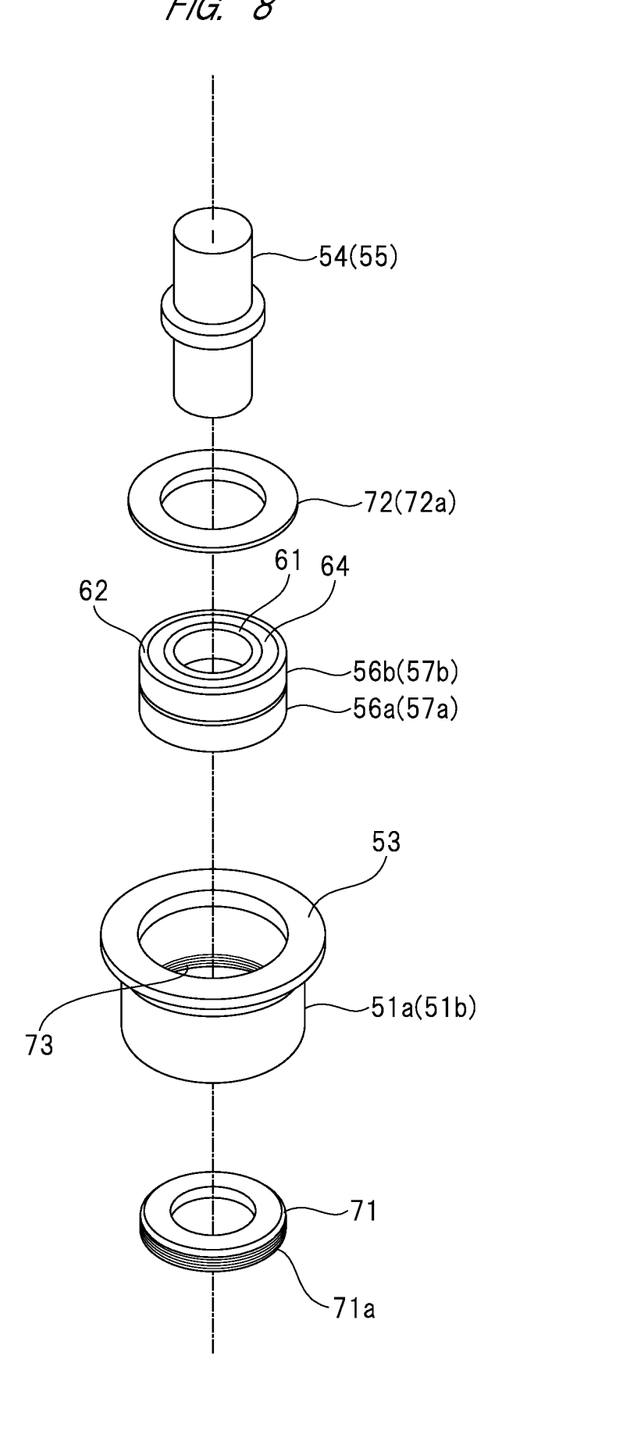
FIG. 8 is an exploded perspective view showing the guide roller and the surrounding structure thereof shown in FIG. 6.

FIG. 7 is a partially enlarged cross-sectional view showing the guide rollers 51*a* and 51*b* and the surrounding structures thereof shown in FIG. 6. FIG. 8 is an exploded perspective view showing the guide rollers 51*a* and 51*b* and the surrounding structures thereof shown in FIG. 6.

As shown in FIG. 7, a shaft (roller shaft 54) is provided on one end side of the roller holding portion 31*a* protruding toward the outer side of the rail 14, and another shaft (roller shaft 55) is provided on the other end side of the roller holding portion 31*a* protruding toward the inner side of the rail 14. The upper portion of the roller shaft 54 is press-fitted into a mounting hole provided in one end of the roller holding portion 31*a*, and the upper portion of the roller shaft 55 is press-fitted into a mounting hole provided in the other end of the roller holding portion 31*a*.

<Bearing>

The guide roller 51*a* is rotatably attached to the lower portion of the roller shaft 54 protruding downward from the roller holding portion 31*a*. Also, the guide roller 51*b* is rotatably attached to the lower portion of the roller shaft 55 protruding downward from the roller holding portion 31*a*. Specifically, the lower portion of the roller shaft 54 is inserted through the guide roller 51*a*, and bearings 56*a* and 56*b* are interposed between the guide roller 51*a* and the lower portion of the roller shaft 54. Also, the lower portion of the roller shaft 55 is inserted through the guide roller 51*b*, and bearings 57*a* and 57*b* are interposed between the guide roller 51*b* and the lower portion of the roller shaft 55. Namely, the guide roller 51*a* is rotatably supported with respect to the roller shaft 54 by the two bearings 56*a* and 56*b*. Also, the guide roller 51*b* is rotatably supported with respect to the roller shaft 55 by the two bearings 57*a* and 57*b*.

The bearings 56*a* and 56*b* interposed between the roller shaft 54 and the guide roller 51*a* overlap each other in the axial direction of the roller shaft 54. Specifically, the bearing 56*b* overlaps the bearing 56*a*. Namely, the two bearings 56*a* and 56*b* overlap in two upper and lower stages. Therefore, in the following description, the bearing 56*a* is referred to as a "lower bearing 56*a*" and the bearing 56*b* is referred to as an "upper bearing 56*b*" in some cases.

The bearings 57*a* and 57*b* interposed between the roller shaft 55 and the guide roller 51*b* overlap in two upper and lower stages in the same manner as the bearings 56*a* and 56*b*. Therefore, in the following description, the bearing 57*a* is referred to as a "lower bearing 57*a*" and the bearing 57*b* is referred to as an "upper bearing 57*b*" in some cases.

As shown in FIG. 7 and FIG. 8, each of the lower bearing 56*a* and the upper bearing 56*b* supporting the guide roller 51*a* is a rolling bearing (ball bearing) including an inner ring 61, an outer ring 62 surrounding the inner ring 61, and a plurality of rolling elements (balls) 63 arranged between the inner ring 61 and the outer ring 62. Each of the lower bearing 56*a* and the upper bearing 56*b* further includes a pair of seals 64 that close the top and bottom of the gaps between the inner ring 61 and the outer ring 62. Each seal 64 is annularly formed of a rubber plate, an iron plate, or the like. Each seal 64 extends in a radially inward direction from the upper and lower edges of the outer ring 62 (toward the inner ring 61)

and covers the gap between the inner ring 61 and the outer ring 62. A lubricant such as grease is filled in the gap between the inner ring 61 and the outer ring 62 covered by the seal 64. Understandably, the tip of each seal 64 is not in contact with the inner ring 61. Namely, the lower bearing 56a and the upper bearing 56b are sealed bearings, more specifically, non-contact sealed bearings.

Note that the lower bearing 57a and the upper bearing 57b supporting the guide roller 51b are non-contact sealed bearings similar to the lower bearing 56a and the upper bearing 56b described above. Namely, the lower bearing 57a and the upper bearing 57b each include the inner ring 61, the outer ring 62, the rolling elements (balls) 63, and the seal 64, and a lubricant such as grease is filled between the inner ring 61 and the outer ring 62.

<Cover Member>

The guide rollers 51a and 51b are provided with a cover member on at least one of the one end side in the axial direction and the other end side in the axial direction. In this embodiment, cover members are provided on both the one end side and the other end side of the guide rollers 51a and 51b in the axial direction. More specifically, a cover member 71 is provided below each of the lower bearing 56a supporting the guide roller 51a and the lower bearing 57a supporting the guide roller 51b. Also, a cover member 72 is provided above each of the upper bearing 56b supporting the guide roller 51a and the upper bearing 57b supporting the guide roller 51b. In the following description, the cover member 71 is referred to as a "lower cover member 71" and the cover member 72 is referred to as an "upper cover member 72" in some cases.

The respective lower cover members 71 are formed in a disc shape that closes the bottoms of the guide rollers 51a and 51b. On the other hand, the respective upper cover members 72 are formed in an annular shape (flanged ring shape) that surrounds the roller shafts 54 and 55.

The lower cover member 71 provided below the lower bearing 56a is not fixed to the roller shaft 54, but is fixed to the guide roller 51a. Also, the lower cover member 71 provided below the lower bearing 57a is not fixed to the roller shaft 55, but is fixed to the guide roller 51b. A screw thread (male thread 71a) is formed on the outer peripheral surface of each lower cover member 71. A screw thread (female thread 73) that can be coupled with the male thread 71a formed on the lower cover member 71 is formed on the inner peripheral surface of each of the guide rollers 51a and 51b. The lower cover member 71 is screwed to the guide rollers 51a and 51b by the male thread 71a and the female thread 73.

Note that the means for fixing the lower cover member 71 to the guide rollers 51a and 51b is not limited to screw coupling. For example, there are embodiments in which the lower cover member 71 is fixed to the guide rollers 51a and 51b by other fixing means such as press-fitting, adhesion, welding, engagement, or the like. Understandably, the lower cover member 71 of this embodiment screwed to the guide rollers 51a and 51b is more securely fixed to the guide rollers 51a and 51b as compared with the lower cover members of other embodiments fixed to the guide rollers 51a and 51b by other fixing means such as press-fitting. In addition, the lower cover member 71 of this embodiment is more advantageous in terms of manufacturing cost than the lower cover members of other embodiments fixed to the guide rollers 51a and 51b by other fixing means such as press-fitting.

The lower cover member 71 of this embodiment screwed to the guide rollers 51a and 51b is detachably attached to the guide rollers 51a and 51b. Therefore, the lower cover member 71 can be attached to each of the guide rollers 51a and 51b after the guide rollers 51a and 51b are assembled with the roller shafts 54 and 55. Also, if necessary, the lower cover member 71 can be detached from the guide rollers 51a and 51b to check the inner state of the guide rollers 51a and 51b.

The upper cover member 72 provided above the upper bearing 56b is not fixed to any of the roller shaft 54 and the guide roller 51a. Also, the upper cover member 72 provided above the upper bearing 57b is not fixed to any of the roller shaft 55 and the guide roller 51b. A flange-shaped support portion 72a is integrally formed around the entire peripheral edge of each upper cover member 72. The support portion 72a of the upper cover member 72 provided above the upper bearing 56b overlaps the flange 53 of the guide roller 51a, but is not fixed to the flange 53. Also, the support portion 72a of the upper cover member 72 provided above the upper bearing 57b overlaps the flange 53 of the guide roller 51b, but is not fixed to the flange 53. Therefore, each upper cover member 72 does not rotate integrally with the guide rollers 51a and 51b, but is rotatable along with the rotation of the guide rollers 51a and 51b. Namely, each upper cover member 72 rotates together with the guide rollers 51a and 51b.

The upper cover members 72 rotating together with the guide rollers 51a and 51b may be scraped by the contact with the guide rollers 51a and 51b. Also, the upper cover members 72 surround the roller shafts 54 and 55. Therefore, the upper cover members 72 may be scraped by the contact with the roller shafts 54 and 55. Thus, in this embodiment, the upper cover member 72 made of resin is used in order to avoid the generation of metal powder or the like, which may adversely affect the bearing. Note that there is no fear that the lower covers 71 fixed to the guide rollers 51a and 51b generate metal powder. Thus, in this embodiment, the lower cover 71 made of metal is used. However, the use of a lower cover member made of resin is not excluded.

The resin material used to form the upper cover member 72 is not particularly limited, but fluorine resin can be presented as an example of a resin material capable of providing the upper cover member 72 with excellent heat resistance and oil resistance and low contact resistance. Also, the metal material used to form the lower cover member 71 is not particularly limited, but carbon steel or SUS (stainless steel) can be presented as an example of an easily processable metal material with excellent heat resistance and oil resistance.

The lower cover member 71 arranged below the lower bearing 56a covers the lower side of the gap between the inner ring 61 and the outer ring 62 of the lower bearing 56a. Also, the lower cover member 71 arranged below the lower bearing 57a covers the lower side of the gap between the inner ring 61 and the outer ring 62 of the lower bearing 57a. Further, the lower cover member 71 is arranged outside the lower seal 64 of each of the lower bearings 56a and 57a so as to overlap the seal 64. Thereby, the lower side of the gap between the inner ring 61 and the outer ring 62 of each of the lower bearings 56a and 57a is doubly covered by the seal 64 and the lower cover member 71. Therefore, as compared with the case where the gap between the inner ring 61 and the outer ring 62 is covered only by the seal 64, oil, dust, and others are less likely to enter the gap between the inner ring 61 and the outer ring 62.

The upper cover member 72 arranged above the upper bearing 56b covers the upper side of the gap between the inner ring 61 and the outer ring 62 of the upper bearing 56b. Also, the upper cover member 72 arranged above the upper bearing 57b covers the upper side of the gap between the inner ring 61 and the outer ring 62 of the upper bearing 57b. Further, the upper cover member 72 is arranged outside the upper seal 64 of each of the upper bearings 56b and 57b so as to overlap the seal 64. Thereby, the upper side of the gap between the inner ring 61 and the outer ring 62 of each of the upper bearings 56b and 57b is doubly covered by the seal 64 and the upper cover member 72. Therefore, as compared with the case where the gap between the inner ring 61 and the outer ring 62 is covered only by the seal 64, oil, dust, and others are less likely to enter the gap between the inner ring 61 and the outer ring 62.

As described above, the gap between the inner ring 61 and the outer ring 62 of each of the lower bearing 56a and the upper bearing 56b supporting the guide roller 51a is doubly covered by the seal and the cover member. Specifically, the lower side of the gap is doubly covered by the seal 64 and the lower cover member 71, and the upper side of the gap is doubly covered by another seal 64 and the upper cover member 72. Therefore, oil, dust, and others are less likely to enter the gap between the inner ring 61 and the outer ring 62 of each of the lower bearing 56a and the upper bearing 56b from both the lower side and the upper side thereof, and the life of the lower bearing 56a and the upper bearing 56b (especially lubrication life) can be extended.

Similarly, the gap between the inner ring 61 and the outer ring 62 of each of the lower bearing 57a and the upper bearing 57b supporting the guide roller 51b is doubly covered by the seal and the cover member. Specifically, the lower side of the gap is doubly covered by the seal 64 and the lower cover member 71, and the upper side of the gap is doubly covered by another seal 64 and the upper cover member 72. Therefore, oil, dust, and others are less likely to enter the gap between the inner ring 61 and the outer ring 62 of each of the lower bearing 57a and the upper bearing 57b from both the lower side and the upper side thereof, and the life of the lower bearing 57a and the upper bearing 57b (especially lubrication life) can be extended.

As can be seen from FIG. 7, the lower cover member 71 is provided in a lower portion of each of the cylindrical guide rollers 51a and 51b, and the upper cover member 72 is provided in an upper part thereof. As a result, an annular space is formed around the lower portion of the roller shaft 54, and the lower bearing 56a and the upper bearing 56b are accommodated in the space. Further, an annular space is formed around the lower portion of the roller shaft and the lower bearing 57a and the upper bearing 57b are accommodated in the space. In other words, the guide roller 51a, the lower cover member 71, and the upper cover member 72 form an accommodation space around the roller shaft 54, in which the lower bearing 56a and the upper bearing 56b are accommodated. Also, the guide roller 51b, the lower cover member 71, and the upper cover member 72 form an accommodation space around the roller shaft 55, in which the lower bearing 57a and the upper bearing 57b are accommodated. Further, the accommodation space may be filled with a lubricant. By filling the spaces in which the lower bearings 56a and 57a and the upper bearings 56b are 57b are accommodated with a lubricant, it is expected that the life of these bearings 56a, 57a, 56b, and 57b can be further extended.

As described above, according to this embodiment, the effect of extending the life of the bearings used in the stretching machine can be obtained. This effect is beneficial regardless of the type of film stretched by the stretching machine 5, and is particularly advantageous when the film stretched by the stretching machine 5 contains oil.

A resin film used for a separator of a lithium ion secondary battery can be presented as an example of a film containing oil. The separator is arranged between a positive electrode plate and a negative electrode plate of a lithium ion secondary battery, and insulates the positive electrode plate and the negative electrode plate. Therefore, the resin film used for the separator is required to have insulation performance. In addition to the insulation performance, the resin film used for the separator is required to have also the performance of smoothly passing an electrolytic solution, lithium ions, and the like. For this reason, a large number of pores are formed in the resin film used for the separator.

As one method of manufacturing an insulating resin film that satisfies the above requirements, the following method is known. That is, a plasticizer is added to a solvent mixed with a resin material to be a raw material of the insulating resin film (hereinafter referred to as "raw material resin"). This plasticizer is a non-volatile solvent capable of forming a uniform solution at a temperature equal to or higher than the melting point of the raw material resin, and is made of a material that can be extracted and removed after forming the thin film. Oil such as liquid paraffin or paraffin wax is used as such a plasticizer.

When an insulating resin film used for a separator of a lithium ion secondary battery is manufactured by the thin film manufacturing system 1 shown in FIG. 1, a raw material resin and the solvent containing the plasticizer are kneaded by the extrusion apparatus 2. The raw material resin (kneaded material) kneaded with the solvent becomes the film 8 through the T-die 3 and the raw sheet cooling apparatus 4. The film 8 is supplied to the stretching machine 5 and stretched. Thereafter, the plasticizer contained in the film 8 is extracted and removed by cleaning process.

The film 8 supplied to the stretching machine 5 in the above process contains a plasticizer which is oil. Some of the oil contained in the film 8 seeps out onto the surface of the film 8 during the stretching process. The oil seeped out onto the surface of the film 8 adheres to the link mechanism 11 and reaches the guide roller through each part of the link mechanism 11.

When the film 8 that contains oil is heated in the heat treatment unit 9 shown in FIG. 1, a large amount of oil seeps out of the film 8. Furthermore, in the heat treatment unit 9 having a higher temperature than the surroundings, the oil seeped out from the film 8 is vaporized and floats inside the heat treatment unit 9. Therefore, in the manufacturing process described above, oil is likely to adhere to each part of the link mechanism 11 particularly when the link mechanism 11 passes through the heat treatment unit 9.

Some of the oil adhering to the link mechanism 11 reaches the guide roller 51a through, for example, the roller holding portion 31a and the roller shaft 54 shown in FIG. 6. Further, another part of the oil adhering to the link mechanism 11 reaches the guide roller 51b through, for example, the roller holding portion 31a and the roller shaft 55 shown in FIG. 6. If the oil that has reached the guide roller 51a and the guide roller 51b permeates the inside of these guide rollers 51a and 51b and further permeates the inside of the lower bearings 56a and 57a and the upper bearings 56b and 57b (gap between the inner ring 61 and the outer ring 62), the lubricant enclosed in these bearings leaks out, or the leakage of the lubricant is accelerated.

For example, fluorine grease is used as the lubricant enclosed in the bearings such as the lower bearing 56a. However, fluorine grease has low affinity with oils such as liquid paraffin and paraffin wax. For this reason, if the oil (liquid paraffin, paraffin wax, etc.) seeped out from the film 8 permeates the inside of the bearings such as the lower bearing 56a, the fluorine grease enclosed in these bearings leaks out, or the leakage of fluorine grease is accelerated. As a result, the life of bearings such as the lower bearing 56a (especially lubrication life) is shortened.

In this embodiment, the cover member for preventing or suppressing oil and dust from entering the bearings such as the lower bearing 56a used in the stretching machine 5 is provided. Therefore, even if the oil adhering to the link mechanism 11 or the like reaches the guide rollers such as the guide rollers 51a and 51b as described above, the oil is prevented or suppressed from entering the bearings supporting the guide rollers, and the life of the bearings can be extended.

Here, the influence of the oil contained in the film 8 on the bearings used in the stretching machine 5 has been described by taking the bearings supporting the guide rollers 51a and 51b as an example. However, the oil contained in the film 8 may give a similar influence on other bearings used in the stretching machine 5 (for example, the bearings supporting the guide rollers 52a and 52b).

In the foregoing, the invention made by the inventors of this application has been specifically described based on the embodiment and example. However, it is needless to say that the present invention is not limited to the above-described embodiment and example and various modifications can be made within the range not departing from the gist thereof. For example, the guide rollers in each link mechanism 11 are not limited to flanged rollers. Also, the bearings supporting the guide rollers are not limited to non-contact ball bearings, and may be contact sealed bearings, for example.

REFERENCE SIGNS LIST 1 thin film manufacturing system
2 extrusion apparatus
3 T-die
4 raw sheet cooling apparatus
5 stretching machine
6 take-off apparatus
7 winder apparatus
8 film
9 heat treatment unit
10R, 10L link device
11 link mechanism
13, 14 rail
16, 17 sprocket
20B, 20C region
21 clip
22 upper link plate
23 lower link plate
24, 24a, 24b rail holder
25 base member
31a, 31b roller holding portion
32a, 32b shaft
33, 34 collar
33a, 33b engaging portion
34 collar
41 main body portion
42 grip portion
43 spring portion
51a, 51b, 52a, 52b guide roller
53 flange
54, 55 roller shaft
56a, 57a bearing (lower bearing)
56b, 57b bearing (upper bearing)
61 inner ring
62 outer ring
63 rolling element (ball)
64 seal
71 cover member (lower cover member)
71a male thread
72 cover member (upper cover member)
72a support portion
73 female thread
L1, L2 separation distance
P1, P2 pitch

The invention claimed is:

1. A link mechanism constituting a link device used in a stretching machine configured to stretch a film, the link mechanism comprising:
  a pair of rail holders;
  a base member bridging the pair of rail holders;
  a link plate having one end rotatably coupled to one of the pair of rail holders and the other end rotatably coupled to another link mechanism; and
  a clip provided at one end of the base member and configured to grip the film,
  wherein each of the rail holders includes:
    a guide roller whose both ends in an axial direction are open and which moves along a rail while rotating;
    a shaft penetrating the guide roller;
    a plurality of bearings interposed between the guide roller and the shaft and rotatably supporting the guide roller; and
    a plurality of cover members that cover the bearings and are provided on at least one of one end side of the guide roller in the axial direction and the other end side of the guide roller in the axial direction,
  wherein the plurality of bearings include a first bearing and a second bearing overlapping the first bearing in an axial direction of the shaft,
  wherein the plurality of cover members include a first cover member arranged below the first bearing and a second cover member arranged above the second bearing,
  wherein the first cover member is formed in a disc shape that closes a bottom of the guide roller,
  wherein the second cover member is formed in an annular shape that surrounds the shaft,
  wherein the first cover member is not fixed to the shaft, but is fixed to the guide roller, and
  wherein the second cover member is not fixed to any of the shaft and the guide roller.

2. The link mechanism according to claim 1,
  wherein a lubricant is filled in a space which is formed by the guide roller, the first cover member, and the second cover member and in which the first bearing and the second bearing are accommodated.

3. The link mechanism according to claim 1,
  wherein the first cover member is made of metal or resin, and the second cover member is made of resin.

4. The link mechanism according to claim 1,
  wherein a screw thread is formed on each of an outer peripheral surface of the first cover member and an inner peripheral surface of the guide roller, and
  wherein the first cover member is screwed to the guide roller.

5. The link mechanism according to claim 1,
  wherein a flange arranged so as to overlap the rail is provided on the one end side of the guide roller in the axial direction, and wherein a support portion arranged to overlap the flange of the guide roller is provided around a peripheral edge of the second cover member.

6. A link device used in a stretching machine configured to stretch a film, the link device comprising:
a rail; and
a plurality of link mechanisms coupled to form an endless chain and capable of moving along the rail,
wherein each of the link mechanisms includes:
  a pair of rail holders;
  a base member bridging the pair of rail holders;
  a link plate having one end rotatably coupled to one of the pair of rail holders and the other end rotatably coupled to another link mechanism; and
  a clip provided at one end of the base member and configured to grip the film,
wherein each of the rail holders includes:
  a guide roller whose both ends in an axial direction are open and which moves along the rail while rotating;
  a shaft penetrating the guide roller;
  a plurality of bearings interposed between the guide roller and the shaft and rotatably supporting the guide roller; and
  a plurality of cover members that cover the bearings and are provided on at least one of one end side of the guide roller in the axial direction and the other end side of the guide roller in the axial direction,
wherein the plurality of bearings include a first bearing and a second bearing overlapping the first bearing in an axial direction of the shaft,
wherein the plurality of cover members include a first cover member arranged below the first bearing and a second cover member arranged above the second bearing,
wherein the first cover member is formed in a disc shape that closes a bottom of the guide roller,
wherein the second cover member is formed in an annular shape that surrounds the shaft,
wherein the first cover member is not fixed to the shaft, but is fixed to the guide roller, and
wherein the second cover member is not fixed to any of the shaft and the guide roller.

7. The link device according to claim 6,
wherein each of the first and second bearings includes an inner ring, an outer ring, and a rolling element arranged between the inner ring and the outer ring, and
wherein a lubricant is filled in a gap between the inner ring and the outer ring.

8. The link device according to claim 7,
wherein each of the first and second bearings has a seal that covers the gap between the inner ring and the outer ring,
wherein the first cover member is arranged outside the seal of the first bearing so as to overlap the seal,
wherein the second cover member is arranged outside the seal of the second bearing so as to overlap the seal,
wherein the gap between the inner ring and the outer ring of the first bearing is doubly covered by the seal and the first cover member, and
wherein the gap between the inner ring and the outer ring of the second bearing is doubly covered by the seal and the second cover member.

9. A stretching machine configured to stretch a film, the stretching machine comprising:
a pair of link devices configured to convey and stretch the film,
wherein each of the link devices includes a rail and a plurality of link mechanisms coupled to form an endless chain and capable of moving along the rail,
wherein each of the link mechanisms includes:
  a pair of rail holders;
  a base member bridging the pair of rail holders;
  a link plate having one end rotatably coupled to one of the pair of rail holders and the other end rotatably coupled to another link mechanism; and
  a clip provided at one end of the base member and configured to grip the film,
wherein each of the rail holders includes:
  a guide roller whose both ends in an axial direction are open and which moves along the rail while rotating;
  a shaft penetrating the guide roller;
  a plurality of bearings interposed between the guide roller and the shaft and rotatably supporting the guide roller; and
  a plurality of cover members that cover the bearings and are provided on at least one of one end side of the guide roller in the axial direction and the other end side of the guide roller in the axial direction,
wherein the plurality of bearings include a first bearing and a second bearing overlapping the first bearing in an axial direction of the shaft,
wherein the plurality of cover members include a first cover member arranged below the first bearing and a second cover member arranged above the second bearing,
wherein the first cover member is formed in a disc shape that closes a bottom of the guide roller,
wherein the second cover member is formed in an annular shape that surrounds the shaft,
wherein the first cover member is not fixed to the shaft, but is fixed to the guide roller, and
wherein the second cover member is not fixed to any of the shaft and the guide roller.

10. The stretching machine according to claim 9,
wherein each of the first and second bearings includes an inner ring, an outer ring, and a rolling element arranged between the inner ring and the outer ring, and
wherein a lubricant is filled in a gap between the inner ring and the outer ring.

11. The stretching machine according to claim 10,
wherein each of the first and second bearings has a seal that covers the gap between the inner ring and the outer ring,
wherein the first cover member is arranged outside the seal of the first bearing so as to overlap the seal,
wherein the second cover member is arranged outside the seal of the second bearing so as to overlap the seal,
wherein the gap between the inner ring and the outer ring of the first bearing is doubly covered by the seal and the first cover member, and
wherein the gap between the inner ring and the outer ring of the second bearing is doubly covered by the seal and the second cover member.

* * * * *